(12) United States Patent
Kataoka et al.

(10) Patent No.: US 6,298,657 B1
(45) Date of Patent: Oct. 9, 2001

(54) COMBINED CYCLE POWER PLANT GENERATION PLANT WITH STEAM COOLING

(76) Inventors: Masahito Kataoka; Taku Ichiryu; Yasushi Fukuizumi, all of c/o Takasago Machinery Works of Mitsubishi Heavy Industries, Ltd., 1-1, Shinhama 2-chome, Arai-cho, Hyogo-ken (JP)

( * ) Notice: Subject to any disclaimer, the term of this patent is extended or adjusted under 35 U.S.C. 154(b) by 0 days.

(21) Appl. No.: 09/693,933

(22) Filed: Oct. 23, 2000

Related U.S. Application Data

(62) Division of application No. 09/109,188, filed on Jul. 2, 1998, now abandoned.

(30) Foreign Application Priority Data

Jul. 4, 1997 (JP) .................................................. 9-179673

(51) Int. Cl.$^7$ .................................. F02C 6/18; F02C 7/16
(52) U.S. Cl. ..................... 60/39.182; 60/39.75; 415/114
(58) Field of Search .............................. 60/39.182, 39.54, 60/39.75; 415/114

(56) References Cited

U.S. PATENT DOCUMENTS

| | | |
|---|---|---|
| 4,424,668 | 1/1984 | Mukherjee . |
| 4,571,935 | 2/1986 | Rice . |
| 5,340,274 | 8/1994 | Cunha . |
| 5,412,937 | 5/1995 | Tomlinson et al. . |
| 5,758,487 | 6/1998 | Salt et al. . |

FOREIGN PATENT DOCUMENTS

| | | |
|---|---|---|
| 062 932 A1 | 10/1982 | (EP) . |
| 764 767 A2 | 3/1997 | (EP) . |
| 63-40244 | 8/1988 | (JP) . |
| 8-270408 | 10/1996 | (JP) . |

Primary Examiner—Louis J. Casaregola

(57) ABSTRACT

In a combined cycle power generation plant in which a gas turbine is cooled by steam, pressure loss of the cooling steam is prevented from increasing and the cooling steam is recovered efficiently. The gas turbine's stationary blade or moving blade is provided with a plurality of mutually independent passages which are arranged in parallel, whereby pressure loss of the cooling steam can be reduced.

24 Claims, 2 Drawing Sheets

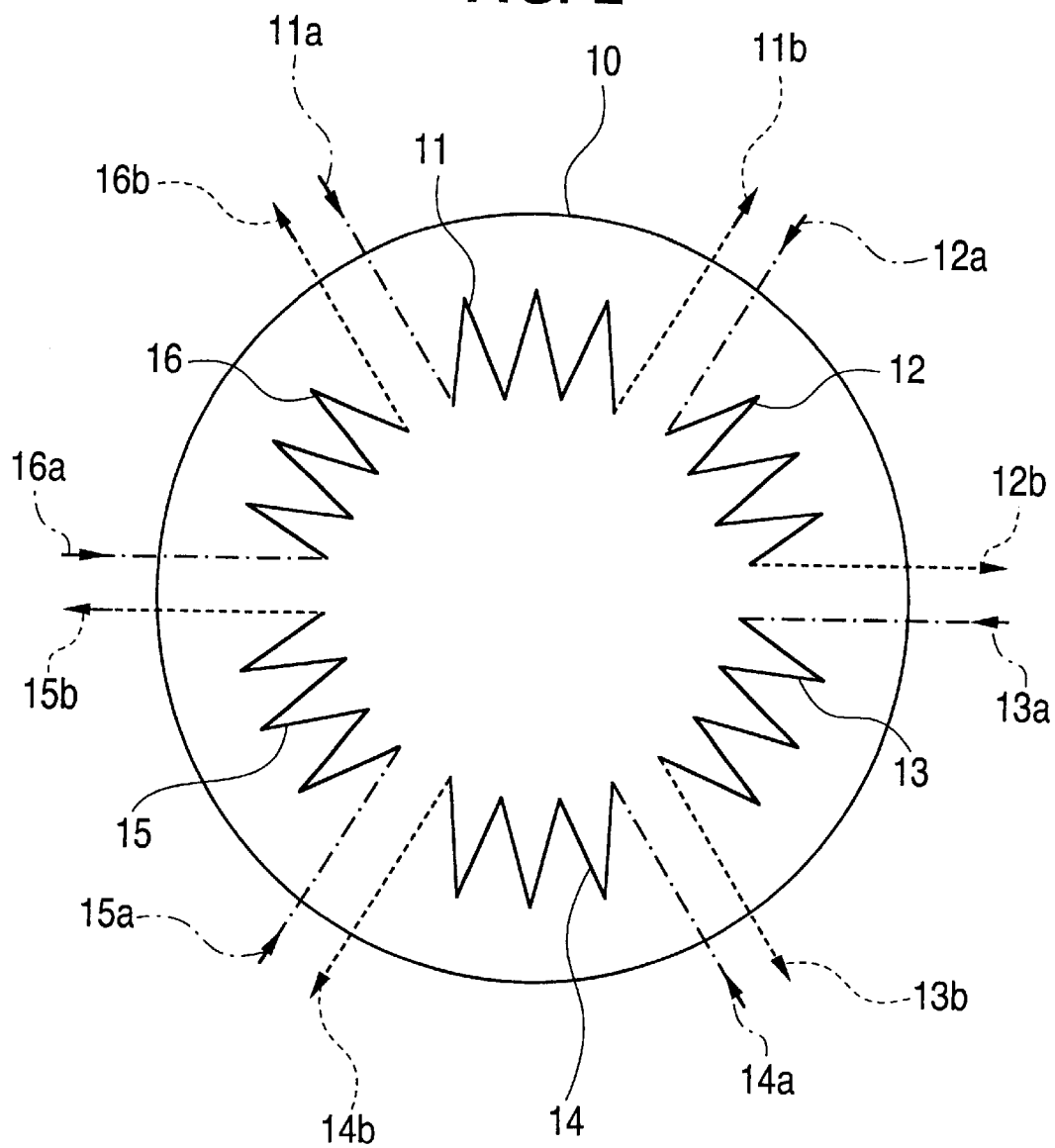

COMBINED CYCLE POWER PLANT GENERATION PLANT WITH STEAM COOLING

This application is a divisional application of Ser. No. 09/109,188, filed Jul. 2, 1998 (abandoned).

BACKGROUND OF THE INVENTION

1. Field of the Invention

The present invention relates to a combined cycle power generation plant including a gas turbine plant and a steam turbine plant.

2. Description of the Prior Art

A combined cycle power generation plant is a power generation system including a gas turbine plant and a steam turbine plant. A high temperature thermal energy is utilized by the gas turbine, and a low temperature thermal energy is utilized by the stream turbine. Thus, the thermal energy is recovered and effectively used.

In such a combined cycle power generation plant, research and development thereof has been done with emphasis on how much the high temperature thermal energy can be increased for enhancing the thermal efficiency of the combined cycle power generation plant.

However, there must be provided a cooling system for cooling the gas turbine after the high temperature thermal energy has been utilized. Air has been used as a cooling medium in this cooling system.

However, when air is used as the cooling medium, even if the high temperature thermal energy is attained, there are problems which prevent the thermal efficiency from being enhanced. These problems include a power loss at an air compressor used for elevating pressure of air which is used for cooling the gas turbine. These problems also include lowering of the mean temperature of a gas flowing in passages in the gas turbine, when the gas is mixed with the air which is used for cooling the gas turbine. This lowering of the mean temperature results in a lowering of energy contained in the gas.

In order to resolve these problems and to enhance the thermal efficiency, a cooling system using the stream s the cooling medium, in place of air, has been disclosed.

Japanese laid-open patent No. Hei 05(1993)-163960 discloses an idea to employ steam as the cooling medium of the gas turbine, but various problems exist therewith which must be resolved.

Japanese laid-open patent No. Hei 05(1993)-163960 discloses only a basic idea of using steam as the cooling medium. In this regard, steam is supplied into a hot gas turbine from a certain steam source and flows through portions to be cooled. Then, the steam is led into a recovery portion after it has cooled the gas turbine. However, no mention is made of particular consideration of problems such as pressure loss of the steam during cooling of the gas turbine.

That is, steam cooling is still in a stage of trial and error, wherein no satisfactory solution to the aforementioned problems has been realized.

The prior remains a basic idea, as mentioned above, wherein cooling steam passages are formed in series so as to communicate with one another along an entire portion of the gas turbine to be cooled, i.e. a stationary system or a rotating system.

That is, the stationary system to be cooled is constructed such that the cooling steam flows in series through a first stage stationary blade and then a second stage stationary blade. The steam becomes heated as it flows through these blades, and then it flows to a recovery portion.

In such a construction, there is caused a large pressure loss at the stationary system to be cooled, and accordingly, various restrictions are placed on the upstream side and the downstream side of the stationary system, which make designing and manufacturing more restrictive. Also, operation of the gas turbine is restricted, and plant efficiency is reduced. That is, if pressure of the steam is reduced when it is recovered, after cooling of the stationary system, output from the steam turbine is accordingly reduced, which results in lowering of plant efficiency.

On the other hand, if a predetermined pressure is to be obtained continuously at the steam turbine, with this pressure loss being considered in advance, a control valve having a capacity larger than is necessary must be provided. This means an increase of cost in designing and manufacturing, as well as employment of an impractically large control valve.

SUMMARY OF THE INVENTION

In view of the mentioned problems in the prior art it is an object of the present invention to provide a combined cycle power generation plant in which pressure loss is prevented from becoming large at the gas turbine to be cooled, and a cooling steam is recovered efficiently.

In order to attain this object, the present invention provides a combined cycle power generation plant including a gas turbine plant, a steam turbine plant, a waste heat recovery boiler using waste heat from a gas turbine of the gas turbine plant for generating steam for driving a steam turbine of the steam turbine plant, a steam system using steam for cooling the gas turbine, and a recovery system for recovering superheated steam from the gas turbine. There is provided at the gas turbine independent parallel cooling steam passages. Because the cooling steam passages are arranged in parallel, locations at which pressure loss of the cooling steam can occur are dispersed, whereby an aggregate of all the pressure losses can be reduced.

In one embodiment, the present invention provides a combined cycle power generation plant as mentioned above, wherein the parallel cooling steam passages consist of a cooling steam passage of a first stage stationary blade, and a cooling steam passage of a second stage stationary blade. Specifically, the stationary blades are provided with mutually independent cooling steam passages which are between the first stage stationary blade and the second stage stationary blade, whereby the pressure loss at the cooling steam passages is dispersed, and hence an aggregate of all the pressure losses can be reduced.

Also in this embodiment, the present invention provides a combined cycle power generation plant as mentioned above, wherein the parallel cooling steam passages consist of a cooling steam passage of a first stage moving blade, and a cooling steam passage of a second stage moving blade. Specifically, the moving blades are provided with mutually independent cooling steam passages which are between the first stage moving blade and the second stage moving blade, whereby the pressure loss at the cooling steam passages is dispersed, and hence an aggregate of all the pressure losses can be reduced.

In a second embodiment, the present invention provides a combined cycle power generation plant as mentioned above, wherein the parallel cooling steam passages consist of a plurality of mutually independent and parallel cooling steam passage systems, with each system comprising a plurality of stationary blades or moving blades sectioned with respect to one another in the same stage. Thus, the pressure loss at the cooling steam passages is dispersed, and hence an aggregate of all the pressure losses can be reduced.

BRIEF DESCRIPTION OF THE DRAWINGS

FIG. 2 is a schematic radial cross sectional view showing a main part of a gas turbine cooled according to a second embodiment of the present invention.

DESCRIPTION OF THE PREFERRED EMBODIMENTS

Figure 1:
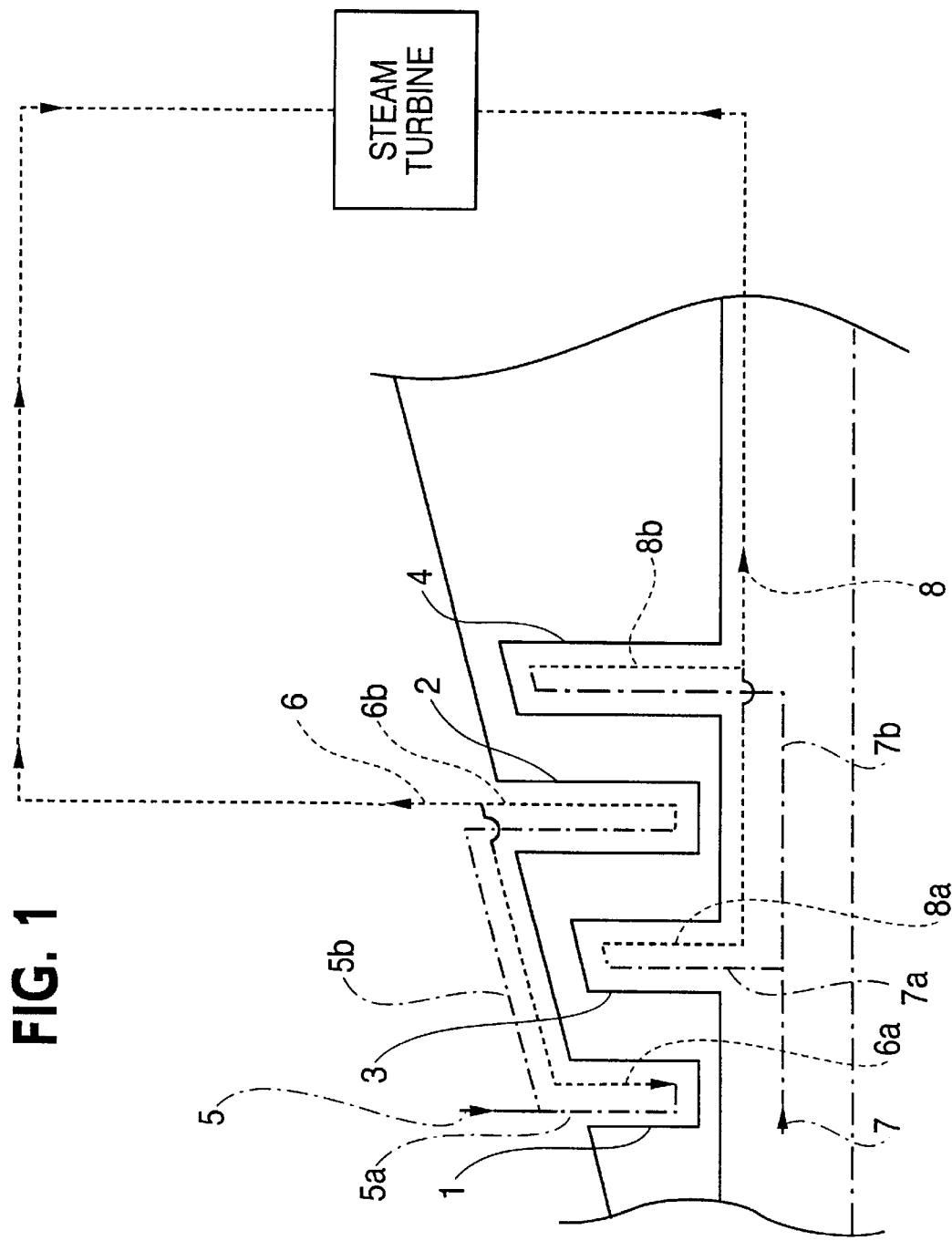
FIG. 1 is a schematic cross sectional view showing a main part of a gas turbine cooled according to a first embodiment of the present invention.

A first embodiment according to the present invention will be described with reference to FIG. 1.

Numeral 1 designates a first stage stationary blade, numeral 2 designates a second stage stationary blade, numeral 3 designates a first stage moving blade, and numeral 4 designates a second stage moving blade. Numeral 5 designates a cooling steam supply channel, which branches midway to communicate with a cooling steam passage 5a of the first stage stationary blade 1, and a cooling steam passage 5b of the second stage stationary blade 2.

The cooling steam passage 5a communicates with a steam recovery passage 6a of the first stage stationary blade 1 via a portion of the first stage stationary blade 1 to be cooled, and the cooling steam passage 5b communicates with a steam recovery passage 6b of the second stage stationary blade 2 via a portion of the second stage stationary blade to be cooled. Both the steam recovery passages 6a and 6b join together at a downstream location to communicate with a steam recovery passage 6.

That is, the cooling steam passage 5a at a position of the first stage stationary blade 1, an the cooling steam passage 5b at a position of the second stage stationary blade 2, form mutually independent and parallel passages. The steam recovery passages 6a and 6b communicating therewith form likewise mutually independent and parallel passages.

Also, as seen on the moving blade side symmetrically with respect to the stationary blade side, numeral 7 designates a cooling steam supply channel, which branches midway to communicate with a cooling steam passage 7a of the first stage moving blade 3, and a cooling steam passage 7b of the second stage moving blade 4.

The cooling steam passage 7a communicates with a steam recovery passage 8a of the first stage moving blade 3 via a portion of the first stage moving blade 3 to be cooled, and the cooling steam passage 7b communicates with a steam recovery passage 8b of the second stage moving blade 4 via a portion of the second stage moving blade 4 to be cooled. Both the steam recovery passages 8a and 8b join together at a downstream location to communicate with a steam recovery passage 8.

That is, like the stationary blade side, the cooling steam passage 7a at a position of the first stage moving blade 3, and the cooling steam passage 7b at a position of the second stage moving blade 4 form mutually independent and parallel passages. The steam recovery passages 8a and 8b communicating therewith form likewise mutually independent and parallel passages.

In this embodiment, as seen on the stationary blade side first, the cooling steam supplied from an outside cooling steam supply source, which is not shown, is fed from the cooling steam supply channel 5 to branch to the cooling steam passages 5a, 5b so as to be led into the first stage stationary blade 1 and the second stage stationary blade 2. Then, the cooling steam is heating through cooling the portions of the first stage stationary blade 1, and the second stage stationary blade 2. This heated steam then flows into the steam recovery passage 6 via the mutual independent and parallel recovery passages 6a, 6b, and is to be heat-recovered at a steam turbine, which is not shown.

In this case, the cooling steam flowing in the cooling steam passage 5a has nothing to do with a pressure loss due to the cooling steam passage 5b, and the cooling steam flowing in the cooling steam passage 5b has nothing to do with a pressure loss due to the cooling steam passage 5a. Hence, the pressure loss as a whole is reduced greatly.

Also, as seen on the moving blade side, the situation is quite the same as on the stationary blade side, and it will be easily understood without repeated explanation that the cooling steam flows with a reduced pressure loss and is heat-recovered at a steam turbine, which is not shown, via the steam recovery passage 8.

Next, a second embodiment according to the present invention will be described with reference to FIG. 2.

Numeral 10 designates a blade set of one stage, comprising a multitude of stationary blades or moving blades along the entire circumference. The blade set 10 is sectioned into six groups, each forming a group of independent cooling steam passages, so that the groups of passages are arranged mutually in parallel about the circumferential direction.

That is, a cooling steam passage 11 of a first blade group comprises a cooling steam supply channel 11a and a steam recovery passage 11b, a cooling steam passage 12 of a second blade group comprises a cooling steam supply channel 12a and a steam recovery passage 12b, and likewise cooling steam passages 13, 14, 15 and 16 of $3^{rd}$, $4^{th}$, $5^{th}$ and $6^{th}$ blade groups, respectively, comprise cooling steam supply channels 13a, 14a, 15a and 16a and steam recovery passages 13b, 14b, 15b and 16b, respectively, so that these six cooling steam passages are arranged mutually in parallel.

In this embodiment, because the cooling steam passages are in parallel about the circumferential direction as mentioned above, the pressure loss is dispersed and suppressed, and like the first embodiment, heat recovery is carried out at a steam turbine, which is not shown.

The present invention has been described with respect to the embodiments shown in figures, but the present invention is not limited thereto and may be modified with various modified within the scope of the claims as hereinbelow set forth.

According to the present invention, the following effect can be obtained. Namely, because the cooling steam flows separately in the mutually independent and parallel passages, as compared to the case in which the cooling steam flows in series through common passages, pressure loss is suppressed, and thus no unnecessary troubles in downstream equipment is realized Also, by cooling the first and second stage stationary blades in parallel coupled with heat recovery of the steam, an effective apparatus having a suppressed pressure loss can be obtained.

Also, by cooling the first and second stage moving blades in parallel coupled with heat recovery of the steam, an effective apparatus having a suppressed pressure loss can be obtained.

Further, by parallel cooling blade groups in the same stage of stationary blades or moving blades, coupled with heat recovery of the steam, an effective apparatus having a suppressed pressure loss can be obtained.

We claim:

1. A combined cycle power generation plant, comprising:
   a gas turbine having a stage with groups of blades;
   a steam turbine;
   a cooling system to use steam to cool said groups of blades, wherein said cooling system includes cooling passages arranged in parallel to convey the steam to cool said groups of blades, respectively; and
   a recovery system to recover the steam after said groups of blades have been cooled thereby, and then to feed the recovered steam to said steam turbine.

2. The combined cycle power generation plant according to claim 1, wherein said cooling passages are circumferentially spaced from one another.

3. The combined cycle power generation plant according to claim 2, wherein said groups of blades are selected from the group consisting of groups of rotary blades of a first stage and groups of rotary blades of a second stage.

4. The combined cycle power generation plant according to claim 3, and further comprising supply channels in fluid communication with said cooling passages, respectively.

5. The combined cycle power generation plant according to claim 4, wherein said recovery system includes recovery passages in fluid communication with said cooling passages, respectively.

6. The combined cycle power generation plant according to claim 2, wherein said groups of blades include groups of stationary blades.

7. The combined cycle power generation plant according to claim 6, and further comprising supply channels in fluid communication with said cooling passages, respectively.

8. The combined cycle power generation plant according to claim 7, wherein said recovery system includes recovery passages in fluid communication with said cooling passages, respectively.

9. The combined cycle power generation plant according to claim 2, and further comprising supply channels in fluid communication with said cooling passages, respectively.

10. The combined cycle power generation plant according to claim 9, wherein said recovery system includes recovery passages in fluid communication with said cooling passages, respectively.

11. The combined cycle power generation plant according to claim 1, and further comprising supply channels in fluid communication with said cooling passages, respectively.

12. The combined cycle power generation plant according to claim 11, wherein said recovery system includes recovery passages in fluid communication with said cooling passages, respectively.

13. A steam system for a combined cycle power generation plant including a gas turbine and a steam turbine, said steam system comprising:
    a cooling system operable to use steam to cool groups of blades of a stage of the gas turbine, wherein said cooling system includes cooling passages arranged in parallel to convey the steam to cool the groups of blades, respectively; and
    a recovery system operable to recover the steam after the groups of blades have been cooled thereby, and then to feed the recovered steam to the steam turbine.

14. The steam system according to claim 13, wherein said cooling passages are circumferentially spaced from one another.

15. The steam system according to claim 14, wherein said cooling system is operable to use steam to cool groups of blades selected from the group consisting of groups of rotary blades of a first stage and groups of rotary blades of a second stage.

16. The steam system according to claim 15, and further comprising supply channels in fluid communication with said cooling passages, respectively.

17. The steam system according to claim 16, wherein said recovery system includes recovery passages in fluid communication with said cooling passages, respectively.

18. The steam system according to claim 14, wherein said cooling system is operable to use steam to cool groups of stationary blades.

19. The steam system according to claim 18, and further comprising supply channels in fluid communication with said cooling passages, respectively.

20. The steam system according to claim 19, wherein said recovery system includes recovery passages in fluid communication with said cooling passages, respectively.

21. The steam system according to claim 14, and further comprising supply channels in fluid communication with said cooling passages, respectively.

22. The steam system according to claim 21, wherein said recovery system includes recovery passages in fluid communication with said cooling passages, respectively.

23. The steam system according to claim 13, and further comprising supply channels in fluid communication with said cooling passages, respectively.

24. The steam system according to claim 23, wherein said recovery system includes recovery passages in fluid communication with said cooling passages, respectively.

* * * * *